United States Patent
Lutz et al.

(10) Patent No.: US 9,949,152 B2
(45) Date of Patent: Apr. 17, 2018

(54) METHOD AND MEASUREMENT SYSTEM FOR TESTING MULTIPLE MOBILE PHONES IN PARALLEL

(71) Applicant: Rohde & Schwarz GmbH & Co. KG, Munich (DE)

(72) Inventors: Thomas Lutz, Munich (DE); Walter Schmitz, Otterfing (DE); Jens Volkmann, Birnbach (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 14/805,449

(22) Filed: Jul. 21, 2015

(65) Prior Publication Data

US 2016/0353300 A1    Dec. 1, 2016

Related U.S. Application Data

(60) Provisional application No. 62/169,167, filed on Jun. 1, 2015.

(51) Int. Cl.
*H04W 24/08*    (2009.01)
*H04B 17/29*    (2015.01)
*H04B 17/15*    (2015.01)

(52) U.S. Cl.
CPC ............ *H04W 24/08* (2013.01); *H04B 17/15* (2015.01); *H04B 17/29* (2015.01)

(58) Field of Classification Search
CPC ...... H04W 24/06; H04W 16/18; H04W 24/00
See application file for complete search history.

(56) References Cited

U.S. PATENT DOCUMENTS

| | | | |
|---|---|---|---|
| 8,478,262 B2 * | 7/2013 | Sun ................... | H04W 36/0088 455/423 |
| 2004/0266423 A1 * | 12/2004 | Morikawa ............. | H04W 24/00 455/424 |
| 2005/0176376 A1 | 8/2005 | Liu | |
| 2009/0124250 A1 * | 5/2009 | Topaltzas .............. | H04W 24/06 455/423 |
| 2012/0122406 A1 | 5/2012 | Gregg et al. | |
| 2014/0169182 A1 * | 6/2014 | Olgaard ................. | H04L 43/50 370/245 |

* cited by examiner

*Primary Examiner* — Joseph Dean, Jr.
(74) *Attorney, Agent, or Firm* — Potomac Technology Law, LLC

(57) ABSTRACT

A method for testing multiple mobile phones performs the testing of a receiving characteristic of each mobile phone in a cyclical sequence of several first measuring tasks. The receiving characteristic of multiple mobile phones in multiple first measuring tasks is tested in parallel.

18 Claims, 4 Drawing Sheets

METHOD AND MEASUREMENT SYSTEM FOR TESTING MULTIPLE MOBILE PHONES IN PARALLEL

RELATED APPLICATIONS

This application claims the benefit of the earlier filing date under 35 U.S.C. § 119(e) of U.S. Provisional Application Ser. No. 62/169,167 (filed 2015 Jun. 1).

BACKGROUND

Embodiments of the present invention relate to approaches for a measurement system and related methods for testing multiple mobile phones in parallel, whereby, depending on the mobile standards used by the mobile phone, multiple parameter values for different parameters of a transmitted signal that is received by the mobile are measured.

United States patent publication no. US 2012/0122406 A1 describes simultaneous downlink testing of multiple mobile phones in a test system. For starting the receiving characteristic of each mobile phone in the downlink test each mobile phone has to be put in a corresponding fixing of the test system. After receiving a common synchronization signal from the test signal generator of the test system the downlink test starts commonly for all the mobile phones fixed in the test system.

Further, a respective batch testing system is known from United States patent publication no. US 2005/0176376 A1.

The test of the transmitter characteristic of each mobile phone in the uplink test has to be performed sequentially. The test of the receiver characteristic of all the mobile phones typically lasts in total approximately one second, whereas the test of the transmitter characteristic of one mobile phone can be performed in a few milliseconds. Consequently, as shown in FIG. 1, a simultaneous downlink test and uplink test can be realized using a full-duplex connector at each fixing of the test system. FIG. 1 shows that at time point tStart1 the downlink test (Rx test) of each mobile phone to be tested in parallel and the uplink test (Tx test) of one mobile phone of these mobile phones are performed, whereas at time point tSTART2 the uplink test (Tx test) of one further mobile phone of these mobile phones is performed. Hereby, as can be seen from FIG. 1 each mobile phone is tested concerning its transmitter characteristic twice for statistical reason.

Both the receiver test and the transmitter comprise a specific number of measuring tasks depending on the mobile standards used by the mobile phones to be tested. In each measuring task mobile standard specific parameter values for technical parameters, such as frequency or signal level of the transmitted RF signal that is received by the mobile phone, type of the baseband signal modulated on the RF signal, duration of the RF signal and so on, are generated/measured. The simultaneous test of the receiver and transmitter characteristic in a corresponding measuring task with corresponding transmitter and receiver specific parameter values is established.

The simultaneous receiver test of multiple mobile phones over a sequence of exemplary N measuring tasks as shown in FIG. 2 is called broadcast mode. In the broadcast mode the common start of the test begins at time point tSTART, if all mobile phones are fixed in the test system and the common end of the test finishes at time point tEND after completion of N measurement tasks. Consequently, the test is disadvantageously interrupted during the period of unfixing the mobile phones of the preceding test and during the period of fixing the next mobile phones for the succeeding test. In FIG. 2 different time points t1, t2, t3 and t4 are indicated, in which each one of the four mobile phones to be tested is fixed in the measurement system. Mobile phone fixed to the measurement system at time point t1 has to wait for the start of the test for the longest time.

Additionally, the number of mobile phones to be tested simultaneously has to be disadvantageously determined before starting the common test. It should be noted that FIG. 1 and FIG. 2 only show the internal state which cannot be considered as prior art.

What is needed, therefore, is an approach for a measurement system and related methods for testing multiple mobile phones in parallel, whereby, depending on the mobile standards used by the mobile phone, multiple parameter values for different parameters of a transmitted signal that is received by the mobile are measured, such that test throughputs are improved and associated costs are reduced.

SOME EXAMPLE EMBODIMENTS

Embodiments of the present invention advantageously address the foregoing requirements and needs, as well as others, by providing a measurement system and related methods for testing multiple mobile phones in parallel, whereby, depending on the mobile standards used by the mobile phone, multiple parameter values for different parameters of a transmitted signal that is received by the mobile are measured, such that test throughputs are improved and associated costs are reduced.

According to one aspect of the invention the sequences of measuring tasks for testing the receiver characteristic of multiple mobile phones in parallel are performed cyclically in the measurement system and in the corresponding method. The measuring task for testing the receiver characteristic of a mobile phone is named first measuring task in the following.

The cyclic organization of the test operation results in a start of the first measuring task in a succeeding sequence of measuring tasks without any interruption after the end of the last measuring task in a preceding sequence of measuring tasks. Furthermore, the total test of each mobile phone can be started at any one of the in total exemplary N measuring tasks. Consequently, for each fixing in the measurement system the exchange of mobile phones to be tested consecutively in the identical fixing can be performed during different measuring tasks. Thus the user of the measurement system has enough time for the exchange of each pair of mobile phones to be tested consecutively in a fixing. Thus, a waiting period for a mobile phone, which is already connected to the measurement system, until all the mobile phones to be tested simultaneously are connected to the measurement system, can advantageously be avoided.

After connecting a new mobile phone in a fixing of the measurement system the system and test software and the test parameters from the measurement system to the newly connected mobile phone via its corresponding control unit are booted. The test of the newly connected mobile phone can be started in a measuring task which succeeds the measurement task in which the boot process is ended.

The test of the transmitter characteristic of a mobile phone is also performed in a sequence of measuring tasks called second measuring task in the following. The test of the transmitter characteristic and the test of the receiver characteristic of a mobile phone are performed in a first measuring task and/or in a second measuring task with generated parameter values corresponding to each other, i.e., exemplarily with the identical frequency of the used RF signal or the identical baseband signal modulated on the RF signal. Thus, the downlink test and the uplink test of each mobile phone to be tested in parallel can be performed simultaneously resulting in a further reduction of the total measuring time.

The test of the transmitter characteristic of each mobile phone runs sequentially in a sequence of identical second measuring tasks, whereby each second measuring task corresponds to one mobile phone to be tested. Thus, the total length of the transmitter test of all mobile phones which are tested in parallel concerning their receiver characteristic in identical second measuring tasks is equal to the length of the receiver test of all parallel tested mobile phones in one corresponding first measuring task. Thus, the volume of changing parameter values in the generated signals within the total test can be minimized.

The order in which the mobile phones to be tested in one second measuring task concerning the transmitter characteristic is determined on generated requests of multiple mobile phones by a specific assignment procedure performed by the measurement system.

At the start of a first measuring task all mobile phones to be tested actually concerning the receiver characteristic have to be fixed and have to be initialized. A delayed joining of one or more mobile phones for a test during that first measuring task is not possible, because the necessary synchronization between the measurement system and all the mobile phones to be tested in parallel by means of a synchronization signal generated by the measurement system takes place at the beginning of each first measuring task.

Consequently, the assignment of the second measuring task to be assigned firstly within the actual first measuring task to a mobile phone takes place on the basis of the requests of all the mobile phones to be synchronized to the measurement system at the beginning of that first measuring task.

After completion of a transmitter test of a mobile phone in a second measuring task the assignment of the identical second measuring task within the actual first measuring task to a further mobile phone is determined on the basis of the rest of the mobile phones which have to be tested concerning the transmitter characteristic within that first measuring task.

In a first inventive variant the order, in which the second measuring tasks within a first measuring task are assigned to the mobile phones, is determined once at the start of the first measuring task.

In the second used inventive variant the order, in which the second measuring tasks within a first measuring task are assigned to the mobile phones, is determined directly before the start of a second measuring task. In this case an erroneous removal of a mobile phone from the measurement system within one first measurement task of the total test can be taken into account in the assignment.

The measurement system according to another aspect of the invention, which performs the inventive measurement method, comprises an analyzer for controlling and for generating and measuring test signals, a switch for switching the test signals between the analyzer and the mobile phones to be tested actually and a number of control units each connected to one of the mobile phones to be tested actually and to the analyzer for controlling the test of the corresponding mobile phone.

BRIEF DESCRIPTION OF THE DRAWINGS

Embodiments of the present inventive method and of the present inventive measurement system for testing multiple mobile phones in parallel are illustrated by way of example only and not by way of any limitation in the figures of the accompanying drawings, in which like reference numerals refer to similar elements. In the drawings

DETAILED DESCRIPTION OF EXAMPLE EMBODIMENTS

Figure 5:
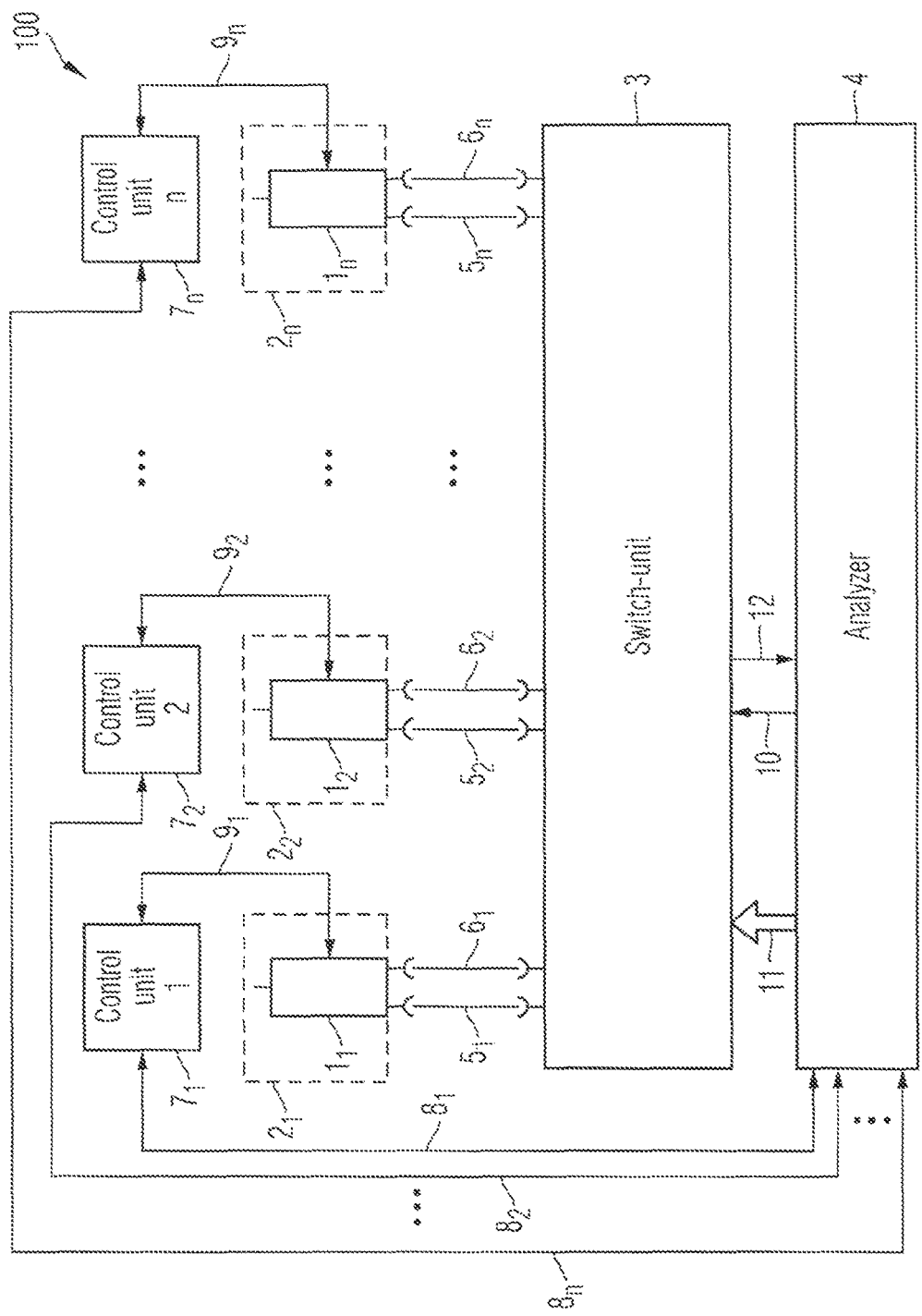
FIG. 5 shows a block diagram of an embodiment of an inventive measurement system for testing multiple mobile phones in parallel.
Figure 6:
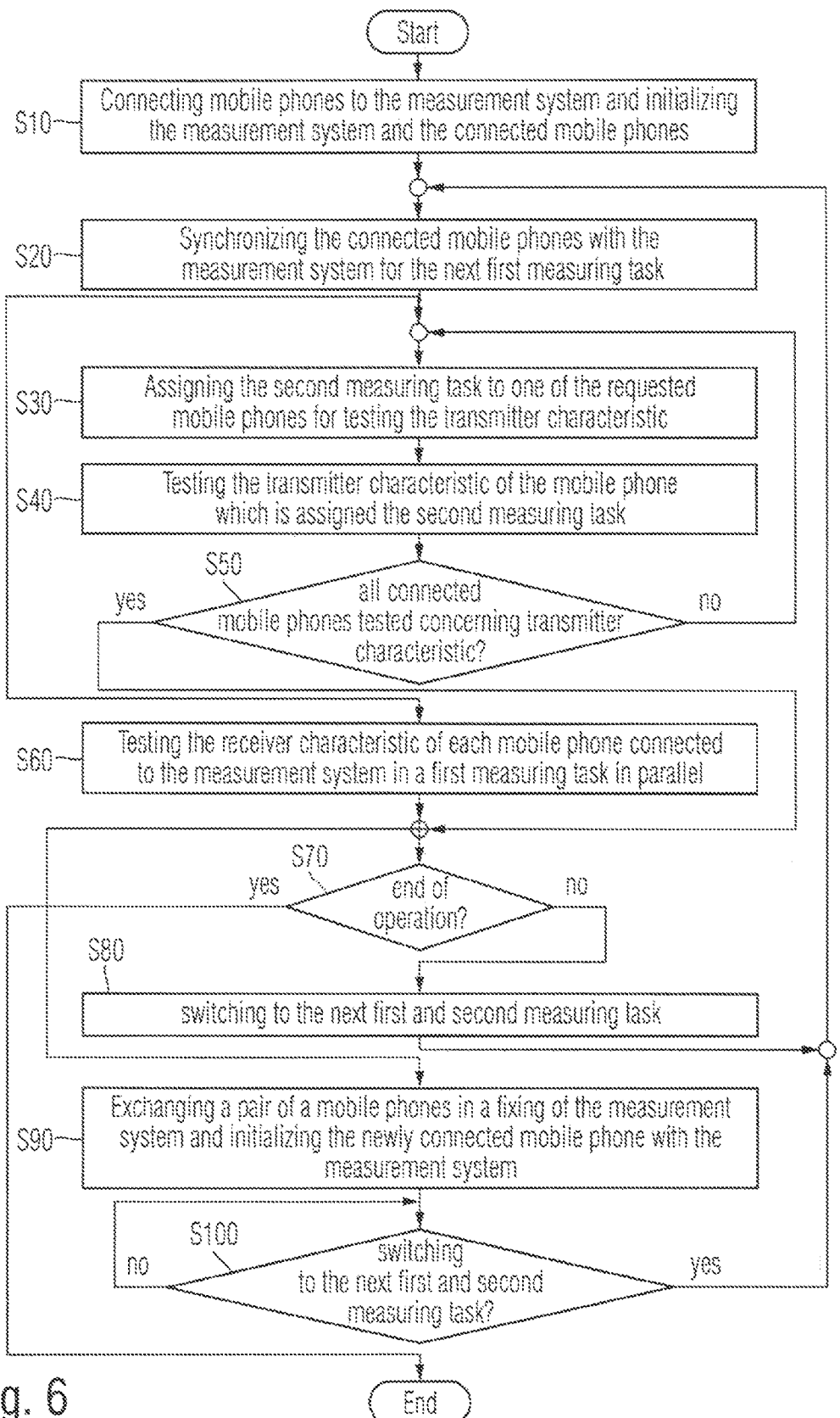
FIG. 6 shows a flowchart of an embodiment of an inventive method for testing multiple mobile phones in parallel.

In the following, the embodiment of the inventive method for testing multiple mobile phones in parallel according to FIG. 6 and the embodiment of the inventive measurement system according to FIG. 5 are described in detail by way of example only.

In the first method step S10 of the inventive method multiple mobile phones $1_1$, $1_2$, . . . , $1_n$ are fixed in corresponding fixings $2_1$, $2_2$, . . . , $2_n$ of the inventive measurement system 3 automatically of by the user. Hereby, all the fixings $2_1$, $2_2$, . . . , $2_n$ or only a part of them can be occupied by a mobile phone $1_1$, $1_2$, . . . , $1_n$ to be tested. Each mobile phone $1_1$, $1_2$, . . . , $1_n$ is connected via a switch unit 3 to an analyzer 4 using a corresponding RF (radio frequency) connection line $5_1$, $5_2$, . . . , $5_n$ for transmitting an RF signal generated by the corresponding mobile phone $1_1$, $1_2$, . . . , $1_n$ and a corresponding RF connection line $6_1$, $6_2$, . . . , $6_n$ for transmitting an RF signal generated by the analyzer 4.

Alternatively to a wire-lined transmission of the RF test signal a wireless transmission of the RF test signals is also possible. In this case the switch unit 3 has to be replaced by one transmitter antenna and one receiver antenna which are connected via the RF connection lines 10 and/or 12 to the analyzer 4.

In the same method step S10 the total measurement system 100 is setup. The setup comprises an initialization of the analyzer 4 and of each control unit $7_1$, $7_2$, . . . , $7_n$ assigned to a mobile phone $1_1$, $1_2$, . . . , $1_n$ to be tested by booting a system and test software and a configuration and a parameterization of the test environment, i.e., of the analyzer 4 and of each control unit $7_1$, $7_2$, . . . , $7_n$, by the user or automatically by the measurement system itself.

Each control unit $7_1$, $7_2$, . . . , $7_n$ is connected to the analyzer 4 via a corresponding connection line $8_1$, $8_2$, . . . , $8_n$, whereby the test data are preferably transmitted between analyzer 4 and the control units $7_1$, $7_2$, . . . , $7_n$ in data packets using a TCP/IP protocol. Each control unit $7_1$, $7_2$, . . . , $7_n$ is connected to a mobile phone $1_1$, $1_2$, . . . , $1_n$ fixed in a corresponding fixing $2_1$, $2_2$, . . . , $2_n$ via a corresponding connection line $9_1$, $9_2$, . . . , $9_n$, preferably a Universal-Serial Bus (USB) connection line.

The configuration of the test environment includes exemplary the determination of the fixings $2_1$, $2_2$, . . . , $2_n$ which are occupied by a mobile phone $1_1, 1_2, \ldots, 1_n$ and the determination of the mobile standards used by the mobile phones $1_1, 1_2, \ldots, 1_n$ and to be tested in the test procedure and so on.

In the next method step S20 each mobile phone $1_1, 1_2, \ldots, 1_n$ fixed in a corresponding fixing $2_1, 2_2, \ldots, 2_n$ is synchronized with the analyzer 4 which is necessary for a correct testing of the receiver characteristic of each mobile phone $1_1, 1_2, \ldots, 1_n$ in the following first measuring task. Hereby, the analyzer 4 generates an appropriate synchronization signal which is transmitted via an RF connection line 10 to correctly positioned switches in the switch unit 3 and from the switch unit 3 via corresponding RF connection lines $6_1, 6_2, \ldots, 6_n$ to the mobile phones $1_1, 1_2, \ldots, 1_n$ fixed in a corresponding fixing $2_1, 2_2, \ldots, 2_n$. The switches in the switch unit 3 are correctly positioned by means of a control signal 11 generated by the analyzer 4. After a successful synchronization a receiver test of each mobile phone $1_1, 1_2, \ldots, 1_n$ can be performed.

In the next method step S30 an assignment of the next second measuring task to one of the mobile phones $1_1, 1_2, \ldots, 1_n$ which is actually fixed in a corresponding fixing $2_1, 2_2, \ldots, 2_n$ and which requests for a second measuring task is performed. Each requesting control unit $7_1, 7_2, \ldots, 7_n$ of a mobile phone $1_1, 1_2, \ldots, 1_n$ which is already not tested concerning its transmitter characteristic in the actual second measuring task sends a request signal to the analyzer 4 via the corresponding connection line $8_1, 8_2, \ldots, 8_n$. On the basis of all request signals received since the last assignment the analyzer 4 determines the mobile phone $1_1, 1_2, \ldots, 1_n$ which will receive the next assignment of the actual second measuring task using a common known assignment algorithm. The next assignment of the actual second measuring task is communicated to the control unit $7_1, 7_2, \ldots, 7_n$ of the mobile phone $1_1, 1_2, \ldots, 1_n$ which receives the next assignment via the corresponding connection line $8_1, 8_2, \ldots, 8_n$.

After receiving the assignment the corresponding control unit $7_1, 7_2, \ldots, 7_n$ locks the measurement capacity of the analyzer 4 for the actual second measurement task and controls the generation and the transmission of an RF test signal in the mobile phone $1_1, 1_2, \ldots, 1_n$ to be tested concerning its transmitter characteristic in the actual assigned second measuring task. The signal parameters of the RF test signal to be transmitted by the mobile phone $1_1, 1_2, \ldots, 1_n$ in the actual second measuring task are known for the corresponding control unit $7_1, 7_2, \ldots, 7_n$. These signal parameters are transferred in total in the setup phase in method step S10 or alternatively actually at the beginning of the assigned second measuring task from the analyzer 4 to the corresponding control unit $7_1, 7_2, \ldots, 7_n$.

The RF test signal is transmitted by the mobile phone $1_1, 1_2, \ldots, 1_n$ to be tested actually via the corresponding RF connection line $5_1, 5_2, \ldots, 5_n$, through correctly positioned switches in the switch unit 3 and the RF connection line 12 to the analyzer 4. In the analyzer the signal parameters of the received RF test signal are measured and evaluated by the analyzer 4 in a comparison with signal parameters of a reference signal for determining the respective errors occurring in the transmitter characteristic of the mobile phone $1_1, 1_2, \ldots, 1_n$ in the actual second measuring task. At the end of the transmitter test of the mobile phone $1_1, 1_2, \ldots, 1_n$ to be tested actually the corresponding control unit $7_1, 7_2, \ldots, 7_n$ signals the analyzer 4 the end of the transmitter test of the actually tested mobile phone $1_1, 1_2, \ldots, 1_n$ by unlocking the measuring capacity of the analyzer 4 for an assignment of the second measurement task to a further mobile phone $1_1, 1_2, \ldots, 1_n$ to be tested.

After completion of the transmitter test of the mobile phone $1_1, 1_2, \ldots, 1_n$ to which the actual second measuring task is assigned in the actual second measuring task the next method step S50 determines if all mobile phones $1_1, 1_2, \ldots, 1_n$ actually fixed in a corresponding fixing $2_1, 2_2, \ldots, 2_n$ are already tested concerning their transmitter characteristic in the actual second measuring task. This is the case, if any requests of mobile phones $1_1, 1_2, \ldots, 1_n$ for a actual second measuring task do not exist anymore and the measuring capacity of the analyzer 4 is unlocked by all the control units $7_1, 7_2, \ldots, 7_n$. A deadlock, i.e., an erroneous locking the measuring capacity of the analyzer 4 by any control unit $7_1, 7_2, \ldots, 7_n$ can be prevented by defining a specific timeout condition since the start of the corresponding first measuring task. If the timeout condition takes place and the measuring capacity of the analyzer 4 is yet locked, an unlocking of the measuring capacity of the analyzer 4 is enforced.

If at least one mobile phone $1_1, 1_2, \ldots, 1_n$ actually connected in a corresponding fixing $2_1, 2_2, \ldots, 2_n$ is not yet tested concerning their transmitter characteristic in the actual second measuring task, an assignment procedure according to method step S40 and a succeeding testing of the transmitter characteristic of the mobile phone $1_1, 1_2, \ldots, 1_n$, in the actual second measuring task according to method step S40 are performed.

Parallel to the multiple times performed method steps S30, S40 and S50 all the mobile phones actually fixed in a corresponding fixing $2_1, 2_2, \ldots, 2_n$ are tested concerning their receiver characteristic in the actual first measuring task in the method step S60.

In the receiver test the analyzer 4 generates and transmits an RF test signal with the signal parameters corresponding to the actual first measuring task. The transmitted RF test signal is transmitted via RF connection line 10, through correctly positioned switches in the switch unit 3 and corresponding RF connection lines $6_1, 6_2, \ldots, 6_n$ to each mobile phone $1_1, 1_2, \ldots, 1_n$ actually fixed in a corresponding fixing $2_1, 2_2, \ldots, 2_n$. The signal parameters of the RF test signal received in a mobile phone $1_1, 1_2, \ldots, 1_n$ are measured by the corresponding control unit $7_1, 7_2, \ldots, 7_n$ via the corresponding connection line $9_1, 9_2, \ldots, 9_n$. The measured signal parameters of the RF test signal are evaluated by the corresponding control unit $7_1, 7_2, \ldots, 7_n$ in a comparison with signal parameters of a reference signal for determining respective errors occurring in the receiver characteristic of the mobile phone $1_1, 1_2, \ldots, 1_n$ in the actual first measuring task. The test result of the receiver characteristic of each mobile phone $1_1, 1_2, \ldots, 1_n$ in the actual first measuring task is transferred by the corresponding control unit $7_1, 7_2, \ldots, 7_n$ via the corresponding connection line $8_1, 8_2, \ldots, 8_n$ to the analyzer 4.

After the completion of the receiver test (downlink test) in the actual first measuring task in method step S60 and after the completion of the transmitter test of each mobile phone $1_1, 1_2, \ldots, 1_n$ actually fixed in a corresponding fixing $2_1, 2_2, \ldots, 2_n$ in the actual second measuring task in method steps S30, S40 and S50 (see symbol ⊕ in the flowchart in FIG. 6) the next method step S70 determines, if the test operation of multiple mobile phones in parallel is finished.

If the test operation is not finished, in the next method step S80 the next first measuring task, i.e., the next corresponding second measuring task, is started by synchronizing each mobile phone $1_1, 1_2, \ldots, 1_n$ with the measurement system, i.e., with the analyzer 4, using a synchronization signal generated by the analyzer 4 in method step S20.

If the preceding first measurement task or second measurement task was the lastly performed first or second measurement task in a sequence of exemplary N first or second measurement tasks, the next first or second measurement task will be the firstly performed first or second measurement task in the sequence of first or second measurement tasks.

After the completion of the receiver test (downlink test) in the actual first measuring task in method step S60 and after the completion of the transmitter test of each mobile phone $1_1, 1_2, \ldots, 1_n$ actually fixed in a corresponding connection position $2_1, 2_2, \ldots, 2_n$ in the actual second measuring task in method steps S30, S40 and S50 a mobile phone $1_1, 1_2, \ldots, 1_n$ can be disconnected from the corresponding fixing $2_1, 2_2, \ldots, 2_n$ in method step S90, if this mobile phone $1_1, 1_2, \ldots, 1_n$ have been tested in all the exemplary N first or second measurement tasks.

This mobile phone $1_1, 1_2, \ldots, 1_n$ can be exchanged by a further mobile phone $1_1, 1_2, \ldots, 1_n$ to be tested in method step S90 by connecting the further mobile phone $1_1, 1_2, \ldots, 1_n$ to be tested to the corresponding fixing $2_1, 2_2, \ldots, 2_n$ of the removed mobile phone $1_1, 1_2, \ldots, 1_n$.

Additionally, in method step S90 the newly fixed mobile phone $1_1, 1_2, \ldots, 1_n$ is initialized with the measurement system by booting the system software, the test software and the test parameters from the analyzer 4 via the assigned control unit $7_1, 7_2, \ldots, 7_n$ to the mobile phone $1_1, 1_2, \ldots, 1_n$.

The initialization of the newly fixed mobile phone $1_1, 1_2, \ldots, 1_n$ in method step S90 typically lasts one or more first or second measurement tasks. Consequently, after completion of the initialization the test of the newly fixed mobile phone $1_1, 1_2, \ldots, 1_n$ can be started in the next first or second measurement task. According to method step S100 the newly fixed mobile phone $1_1, 1_2, \ldots, 1_n$ has to wait for the test after completion of the initialization, until the next first or second measurement task starts.

With the start of the next first or second measurement task the newly fixed mobile phone $1_1, 1_2, \ldots, 1_n$ in a corresponding fixing $2_1, 2_2, \ldots, 2_n$ and the mobile phones $1_1, 1_2, \ldots, 1_n$ which are already fixed for at least one first or second measurement task in a corresponding fixing $2_1, 2_2, \ldots, 2_n$ are synchronized with the analyzer 4 for the next first or second measurement task in method step S20.

If method step S70 determines an end of the operation test, the rest of the mobile phone $1_1, 1_2, \ldots, 1_n$ fixed in a corresponding fixing $2_1, 2_2, \ldots, 2_n$ can be disconnected and the inventive method finishes.

Figure 1:
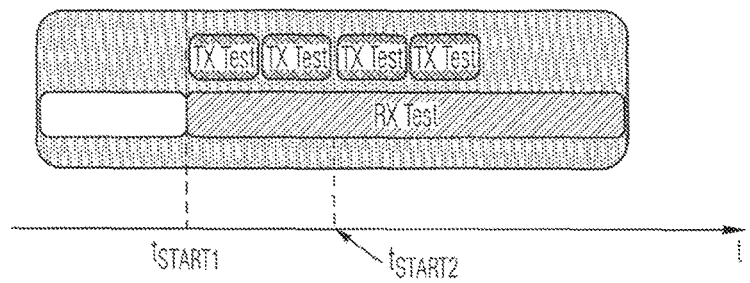
FIG. 1 shows a time diagram containing first and second measuring tasks.
Figure 2:
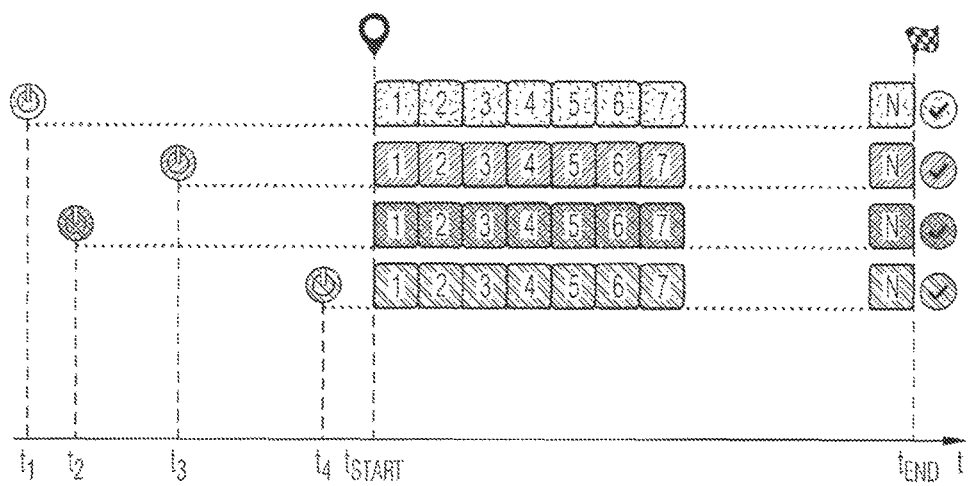
FIG. 2 shows a time diagram of a test procedure with sequences of first measuring tasks.
Figure 3:
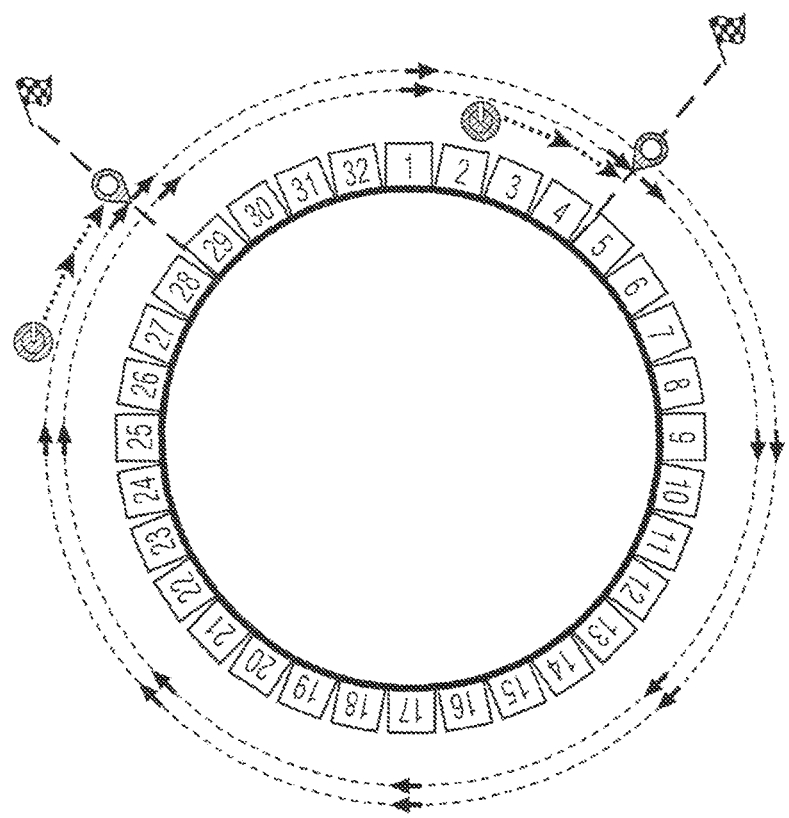
FIG. 3 shows a time diagram of an embodiment of an inventive test procedure with a sequence of first measuring tasks.

FIG. 3 shows the cyclic time characteristic of a sequence of in total 32 first or second measurement tasks. A first mobile (inner circle) is fixed to the measurement system during the first or second measurement task no. 2. The test of the first mobile phone starts at the beginning of first or second measurement task no. 5 after initialization of the first mobile phone with the measurement system and consequently ends at the end of first or second measurement task no. 4.

A second mobile (outer circle) is fixed to the measurement system during the first or second measurement task no. 26. The test of the second mobile phone starts at the beginning of the first or second measurement task no. 29 after initialization of the second mobile phone with the measurement system and consequently ends at the end of the first or second measurement task no. 28.

Figure 4:
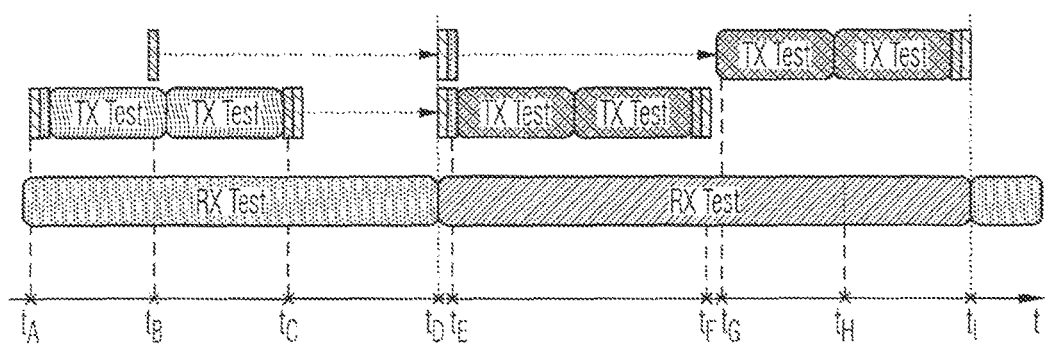
FIG. 4 shows a time diagram of an embodiment of an inventive test procedure with a sequence of first and second measuring tasks.

FIG. 4 shows the timing of the assignment of a second measurement task to mobile phones requesting for a transmitter test. The second measuring task for the transmitter test of the second mobile phone (second line in FIG. 4) starts at time point $t_A$ and finishes at time point $t_C$. As can be seen from FIG. 4 the transmitter test is performed for each mobile phone twice in each an identical second measuring task for statistical reason.

A simultaneously performed first measuring task for testing the receiver characteristic of each mobile phone to be tested in parallel (third line in FIG. 4) lasts until time point $t_D$.

At time point $t_B$ the first mobile phone (first line in FIG. 4) which starts the total test requests for an assignment of the next second measurement task, whereas the second mobile phone requests for an assignment of the next second measurement task at the end of its actually performed second measurement task at time point $t_C$.

After the end of the actual first measurement task at time point to additional requests from further mobile phone for an assignment of the actual second measuring task do not exist. Thus a new synchronization between the analyzer and the mobile phones to be tested in parallel concerning their receiver characteristic for the next first measurement task takes place. At time point $t_D$ the analyzer assigns the next second measurement task firstly to the lastly requested mobile phone, i.e., the second mobile phone. At time point $t_E$ the control unit of the second mobile phone starts the assigned second measurement task by locking the measuring capacity of the analyzer.

After completion of the second measuring task at time point $t_F$ the second mobile phone unlocks the measuring capacity of the analyzer. Thus at time point $t_F$ the first mobile phone is assigned the second measurement task from the analyzer. At time point $t_G$ the control unit of the first mobile phone starts the assigned second measurement task by locking the measuring capacity of the analyzer.

Normally, at time point $t_H$ the actual first measurement task finishes. However, the measuring capacity of the analyzer is locked from the first mobile phone. Thus the actual first measuring task is elongated until time point $t_I$, at which the second measurement task assigned to the first mobile phone finishes and consequently the measuring capacity of the analyzer is unlocked by the control unit of the first mobile phone.

At time point $t_I$ additional requests from further mobile phones for an assignment of the actual second measuring task do not exist. A deadlock situation is prevented by using a timeout condition, i.e., after a defined period of time since the start of the actual first measurement task the actual first measurement task is enforced to end in each case. Thus at time point $t_I$ or after occurring the timeout condition the synchronization between the mobile phones to be tested in parallel and the analyzer for a next first measuring task can be started.

The invention is not restricted to the exemplary embodiments and exemplary variants. Advantageously, all the features described above or features shown in the figures of the drawings or features claimed in all the claims can be combined with one another arbitrarily within the scope of the invention.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A method for testing a plurality of mobile phones in a test system, comprising:
    testing a receiver characteristic of each mobile phone via a sequence of first measurement tasks; and
    testing a transmitter characteristic of each mobile phone via a sequence of second measurement tasks, wherein test parameters for each of the sequence of second measurement tasks correspond to test parameters of a corresponding first measurement task and the testing of the transmitter characteristic of each mobile phone is performed twice for statistical purposes,
    wherein each of the plurality of mobile phones is synchronized with the test system prior to testing the receiver characteristic of the mobile phone via the sequence of first measurement tasks,
    wherein the sequence of first measurement tasks is performed in a repeating cycle,
    wherein the sequence of first measurement tasks for each of the plurality of mobile phones is performed in parallel, and
    wherein, for each mobile phone, once the mobile phone is synchronized with the test system, the testing of the receiver characteristic of the mobile phone begins at a one of the first measurement tasks in the repeating cycle that is currently being performed, which avoids a delay in beginning the testing of a newly connected mobile phone to the test system.

2. The method according to claim 1, wherein, prior to performing the sequence of first measurement tasks for each mobile phone, the method further comprises:
    initializing the respective mobile phone with the test system.

3. The method according to claim 2, wherein the testing of each mobile phone ends at a one of the first measurement tasks of the respective sequence of first measurement tasks that directly precedes a first one of the first measurements tasks of the respective sequence of first measurement tasks at which the test of the mobile phone began.

4. The method according to claim 1, wherein the test of the mobile phone in one second measurement task is performed during the test of the mobile phone in the corresponding first measurement task.

5. The method according to claim 1, wherein the transmitter characteristics of the mobile phones are tested sequentially, wherein for each mobile phone the transmitter characteristic is tests via a second measurement task that corresponds to a one of the first measurement tasks whereby the receiver characteristics of the same mobile phone is tested.

6. The method according to claim 1, wherein a length of the first measurement tasks whereby the receiver characteristic of the mobile phones is tested corresponds to a summed length of corresponding second measurement tasks whereby the transmitter characteristics of the same mobile phones are tested.

7. The method according to claim 1, wherein an order of the second measurement tasks, whereby the transmitter characteristic of each mobile phone is tested, is assigned on the basis of respective requests from the mobile phones to be tested via the second measurement tasks.

8. The method according to claim 7, wherein, after a mobile phone is tested via the second measurement task, a next mobile phone to be tested via that second measurement task is assigned to be tested on the basis of respective requests from a remainder of the mobile phones to be tested via that second measurement task.

9. The method according to claim 7, wherein a first of the mobile phones to be tested via the second measurement task is tested after a start of a corresponding first measurement task.

10. A test system for parallel testing of a plurality of mobile phones, comprising:
    a radio frequency (RF) signal analyzer; and
    a plurality of controllers, each connected to a one of the mobile phones to be tested and to the RF signal analyzer, wherein each controller is configured to control the testing of the respective connected mobile phone; and
    wherein the RF signal analyzer is configured to test a receiver characteristic of each mobile phone via a sequence of first measurement tasks, and to test a transmitter characteristic of each mobile phone via a sequence of second measurement tasks,
    wherein test parameters for each of the sequence of second measurement tasks correspond to test parameters of a corresponding first measurement task and the testing of the transmitter characteristic of each mobile phone is performed twice for statistical purposes,
    wherein each mobile phone is synchronized with the test system prior to testing the receiver characteristic of the mobile phone via the sequence of first measurement tasks,
    wherein the sequence of first measurement tasks is performed in a repeating cycle,
    wherein the sequence of first measurement tasks for each of the plurality of mobile phones is performed in parallel, and
    wherein, for each mobile phone, once the mobile phone is synchronized with the test system, the testing of the receiver characteristic of the mobile phone begins at a one of the first measurement tasks in the repeating cycle that is currently being performed, which avoids a delay in beginning the testing of a newly connected mobile phone to the test system.

11. The test system according to claim 10, wherein, prior to performing the sequence of first measurement tasks for each mobile phone, the respective mobile phone is initialized with the test.

12. The test system according to claim 11, wherein each controller is configured to end the testing of the respective mobile phone at a one of the first measurement tasks of the respective sequence of first measurement tasks that directly precedes a first one of the first measurements tasks of the respective sequence of first measurement tasks at which the test of the mobile phone began.

13. The test system according to claim 10, wherein the test of the mobile phone in one second measurement task is performed during the test of the mobile phone in the corresponding first measurement task.

14. The test system according to claim 10, wherein the RF signal analyzer is further configured to perform the testing of the transmitter characteristics of the mobile phones sequentially, wherein for each mobile phone the transmitter characteristic is tests via a second measurement task that corresponds to a one of the first measurement tasks whereby the receiver characteristics of the same mobile phone is tested.

15. The test system according to claim 10, wherein a length of the first measurement tasks whereby the receiver characteristic of the mobile phones is tested corresponds to a summed length of corresponding second measurement tasks whereby the transmitter characteristics of the same mobile phones are tested.

16. The test system according to claim 10, wherein an order of the second measurement tasks, whereby the transmitter characteristic of each mobile phone is tested, is assigned on the basis of respective requests from the mobile phones to be tested via the second measurement tasks.

17. The test system according to claim 16, wherein, after a mobile phone is tested via the second measurement task, a next mobile phone to be tested via that second measurement task is assigned to be tested on the basis of respective requests from a remainder of the mobile phones to be tested via that second measurement task.

18. The test system according to claim 16, wherein a first of the mobile phones to be tested via the second measurement task is tested after a start of a corresponding first measurement task.

* * * * *